United States Patent
Williamson

(10) Patent No.: US 11,557,130 B2
(45) Date of Patent: Jan. 17, 2023

(54) METHOD AND APPARATUS FOR DETERMINING THE CLASSIFICATION OF AN OBJECT

(71) Applicant: HERE Global B.V., Eindhoven (NL)

(72) Inventor: Dennis Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 30 days.

(21) Appl. No.: 17/347,775

(22) Filed: Jun. 15, 2021

(65) Prior Publication Data

US 2022/0398403 A1 Dec. 15, 2022

(51) Int. Cl.
*G06K 9/00* (2022.01)
*G06V 20/58* (2022.01)
*G06K 9/62* (2022.01)

(52) U.S. Cl.
CPC .......... *G06V 20/582* (2022.01); *G06K 9/628* (2013.01)

(58) Field of Classification Search
CPC ............................ G06V 20/582; G06K 9/628
See application file for complete search history.

(56) References Cited

U.S. PATENT DOCUMENTS

| | | | |
|---|---|---|---|
| 9,517,768 B2 | 12/2016 | Oh et al. | |
| 10,762,364 B2 | 9/2020 | Stenneth et al. | |
| 2020/0401817 A1 | 12/2020 | Schroeter | |
| 2020/0410259 A1 | 12/2020 | Srinivasan | |

*Primary Examiner* — Dhaval V Patel
(74) *Attorney, Agent, or Firm* — Alston & Bird LLP

(57) ABSTRACT

Methods described herein relate to disambiguating objects for a particular location. Methods may include receiving, from a vehicle, an indication of an object associated with an object classification for the object in view of the vehicle. The object classification is further associated with an object type. The method further includes receiving, from the vehicle, information pertaining to one or more other objects of the same object type within a predefined distance of the object; determining an expectation count for the object type based at least in part on a count of the object and the one or more objects of the same object type for the particular location; and disambiguating one or more object classifications from a plurality of object classifications based at least in part on the expectation count. A corresponding apparatus and computer program product are also provided.

20 Claims, 5 Drawing Sheets

300

```
┌─────────────────────────────────────────────────┐
│  RECEIVING AN INDICATION OF AN OBJECT ASSOCIATED WITH │
│  AN OBJECT CLASSIFICATION FOR THE OBJECT IN VIEW OF A │
│                      VEHICLE                          │
│                        301                            │
└─────────────────────────────────────────────────┘
                         │
                         ▼
┌─────────────────────────────────────────────────┐
│  RECEIVING INFORMATION PERTAINING TO ONE OR MORE │
│   OTHER OBJECTS OF THE SAME OBJECT TYPE WITHIN A │
│        PREDEFINED DISTANCE OF THE OBJECT         │
│                       302                        │
└─────────────────────────────────────────────────┘
                         │
                         ▼
┌─────────────────────────────────────────────────┐
│  DETERMINING AN EXPECTATION COUNT FOR THE OBJECT │
│  TYPE BASED AT LEAST IN PART ON A COUNT OF THE OBJECT │
│  AND THE ONE OR MORE OBJECTS OF THE SAME OBJECT TYPE │
│             FOR THE PARTICULAR LOCATION              │
│                        303                           │
└─────────────────────────────────────────────────┘
                         │
                         ▼
┌─────────────────────────────────────────────────┐
│ DISAMBIGUATING ONE OR MORE OBJECT CLASSIFICATIONS │
│ FROM A PLURALITY OF OBJECT CLASSIFICATIONS BASED AT │
│     LEAST IN PART ON THE EXPECTATION COUNT          │
│                       304                           │
└─────────────────────────────────────────────────┘
```

```
┌─────────────────────────────────────────────────────────────────────┐
│ RECEIVING, FROM ONE OR MORE ADDITIONAL VEHICLES, ONE OR MORE        │
│ INDICATIONS OF THE OBJECT ASSOCIATED WITH AN OBJECT CLASSIFICATION  │
│ FOR THE OBJECT IN VIEW OF THE ONE OR MORE VEHICLES                  │
│ 401                                                                 │
└─────────────────────────────────────────────────────────────────────┘
                                   │
                                   ▼
┌─────────────────────────────────────────────────────────────────────┐
│ RECEIVING, FROM THE ONE OR MORE ADDITIONAL VEHICLES, INFORMATION    │
│ PERTAINING TO ONE OR MORE OTHER OBJECTS OF THE SAME TYPE WITHIN A   │
│ PREDEFINED DISTANCE OF THE OBJECT IN THE SAME LOCATION              │
│ 402                                                                 │
└─────────────────────────────────────────────────────────────────────┘
                                   │
                                   ▼
┌─────────────────────────────────────────────────────────────────────┐
│ DETERMINING WHETHER THE COUNT OF THE OBJECT AND THE ONE OR MORE     │
│ OBJECTS OF THE SAME TYPE FOR THE PARTICULAR LOCATION MATCHES THE    │
│ EXPECTATION COUNT FOR THE OBJECT TYPE                               │
│ 403                                                                 │
└─────────────────────────────────────────────────────────────────────┘
                                   │
                                   ▼
┌─────────────────────────────────────────────────────────────────────┐
│ UPDATING THE EXPECTATION COUNT IN AN INSTANCE THE COUNT OF THE      │
│ OBJECT AND THE ONE OR MORE OBJECTS OF THE SAME TYPE FOR THE         │
│ PARTICULAR LOCATION IS GREATER THAN THE EXPECTATION COUNT           │
│ 404                                                                 │
└─────────────────────────────────────────────────────────────────────┘
```

```
┌─────────────────────────────────────────────────────────────────────┐
│ SELECTING ONE OR MORE RECEIVED OBJECTS EACH ASSOCIATED WITH AN OBJECT │
│           CLASSIFICATION FOR THE PARTICULAR LOCATION                  │
│                              501                                      │
└─────────────────────────────────────────────────────────────────────┘
                                    │
                                    ▼
┌─────────────────────────────────────────────────────────────────────┐
│ OMITTING ONE OR MORE RECEIVED OBJECTS EACH ASSOCIATED WITH AN OBJECT │
│           CLASSIFICATION FOR THE PARTICULAR LOCATION                  │
│                              502                                      │
└─────────────────────────────────────────────────────────────────────┘
```

Figure 5

METHOD AND APPARATUS FOR DETERMINING THE CLASSIFICATION OF AN OBJECT

TECHNOLOGICAL FIELD

Example embodiments of the present invention relate generally to a method, apparatus, and computer program product for disambiguating objects at a particular location, more particularly, to a method, apparatus, and computer program product for disambiguating objects at a particular location based at least in part on an expectation count.

BACKGROUND

In order to provide for navigation of vehicles, objects, such as traffic signage, arrows, markings, or other traffic indicia on traffic routes must be properly classified to ensure either that an autonomous or semi-autonomous vehicle accurately adheres to rules and/or directions indicated by such objects or that a driver of a manually-operated vehicle is provided with navigational instructions that similarly adhere to the rules and/or directions indicated by such objects. For example, an object type such as a speed limit sign, may be used to indicate the speed limit for a particular road segment. Object types may have various object classifications that provide further detail. For example, a speed limit object type may have various classifications, such as an object classification of 30 kilometre per hour (kph) speed limit and an object classification of 80 kph speed limit, which specify the speed limit for the road segment. Vehicles, such as partially or fully autonomous vehicles, may base part of their operation on one or more of these objects, such as the speed to travel based at least in part on the speed limit sign for the road segment on which they are traveling.

BRIEF SUMMARY

A method, apparatus, and computer program product are provided in accordance with an example embodiment in order to disambiguate one or more objects in a particular location. In this regard, a cluster of one or more objects may be disambiguated based at least in part information pertaining to one or more other objects of the same object type in the same location, such as a count of one or more other objects of the same object type. By factoring in a count of other nearby objects of the same object type in the location, enhanced information is provided that leads to a more accurate determination of the classification of one or more objects in the area and may allow mapping software to disambiguate conflicting classifications of the same object. By determining the classification of one or more objects with enhanced accuracy, one or more map models may be updated to reflect a more accurate depiction of one or more road segments and the objects pertaining to said road segments.

In an example embodiment, a method is provided for disambiguating objects for a particular location. The method includes receiving, from a vehicle, an indication of an object associated with an object classification for the object in view of the vehicle, wherein the object classification is further associated with an object type. The method further includes receiving, from the vehicle, information pertaining to one or more other objects of the same object type within a predefined distance of the object. The method further includes determining an expectation count for the object type based at least in part on a count of the object and the one or more objects of the same object type for the particular location. The method further includes disambiguating one or more object classifications from a plurality of object classifications based at least in part on the expectation count.

In some embodiments, the method further includes receiving, from one or more additional vehicles, one or more indications of the object associated with an object classification for the object in view of the one or more vehicles. The object classification is further associated with the object type. The method further includes receiving, from the one or more additional vehicles, information pertaining to one or more other objects of the same type within a predefined distance of the object in the same location. The method further includes determining whether the count of the object and the one or more objects of the same type for the particular location matches the expectation count for the object type in the particular location.

In some embodiments, the method further includes, updating the expectation count in an instance the count of the object and the one or more objects of the same type for the particular location is greater than the expectation count.

In some embodiments, the method further includes disambiguating by selecting one or more received objects, each associated with an object classification, for the particular location for use in a mapping model based at least in part on the expectation count.

In some embodiments, the method further includes determining a median expectation count based at least in part on the count of the object and the one or more objects of the same type and one or more historical counts of the object and the one or more objects of the same type for the particular location.

In some embodiments, the method further includes selecting one or more received objects, each associated with an object classification, for the particular location for use in a mapping model based at least in part on the median expectation count.

In some embodiments, the method further includes determining a nearest integer value for the median expectation count.

In an example embodiment, an apparatus is provided for disambiguating objects for a particular location. The apparatus includes at least one processor and at least one memory including computer program code with the at least one memory and the computer program code configured to, with the at least one processor, cause the apparatus to receive, from a vehicle, an indication of an object associated with an object classification for the object in view of the vehicle, wherein the object classification is further associated with an object type. The at least one memory and the computer program code are further configured to, with the at least one processor, cause the apparatus to receive, from the vehicle, information pertaining to one or more other objects of the same object type within a predefined distance of the object. The at least one memory and the computer program code are further configured to, with the at least one processor, cause the apparatus to determine an expectation count for the object type based at least in part on a count of the object and the one or more objects of the same object type for the particular location. The at least one memory and the computer program code are further configured to, with the at least one processor, cause the apparatus to disambiguate one or more object classifications from a plurality of object classifications based at least in part on the expectation count.

In some embodiments, the at least one memory and the computer program code are further configured to, with the at least one processor, cause the apparatus to receive, from one or more additional vehicles, one or more indications of the object associated with an object classification for the object in view of the one or more vehicles. The object classification is further associated with the object type. The at least one memory and the computer program code are further configured to, with the at least one processor, cause the apparatus to receive, from the one or more additional vehicles, information pertaining to one or more other objects of the same type within a predefined distance of the object in the same location. The at least one memory and the computer program code are further configured to, with the at least one processor, cause the apparatus to determine whether the count of the object and the one or more objects of the same type for the particular location matches the expectation count for the object type in the particular location.

In some embodiments, the at least one memory and the computer program code are further configured to, with the at least one processor, cause the apparatus to, update the expectation count in an instance the count of the object and the one or more objects of the same type for the particular location is greater than the expectation count.

In some embodiments, the at least one memory and the computer program code are further configured to, with the at least one processor, cause the apparatus to disambiguate by selecting one or more received objects, each associated with an object classification, for the particular location for use in a mapping model based at least in part on the expectation count.

In some embodiments, the at least one memory and the computer program code are further configured to, with the at least one processor, cause the apparatus to determine a median expectation count based at least in part on the count of the object and the one or more objects of the same type and one or more historical counts of the object and the one or more objects of the same type for the particular location.

In some embodiments, the at least one memory and the computer program code are further configured to, with the at least one processor, cause the apparatus to select one or more received objects, each associated with an object classification, for the particular location for use in a mapping model based at least in part on the median expectation count.

In some embodiments, the at least one memory and the computer program code are further configured to, with the at least one processor, cause the apparatus to determine a nearest integer value for the median expectation count.

In an example embodiment, a computer program product is provided for disambiguating objects for a particular location. The computer program product includes at least one non-transitory computer-readable storage medium having computer-executable program code portions stored therein. The computer-executable program code portions include program code instructions configured to receive, from a vehicle, an indication of an object associated with an object classification for the object in view of the vehicle, wherein the object classification is further associated with an object type. The computer-executable program code portions of an example embodiment also include program code instructions configured to receive, from the vehicle, information pertaining to one or more other objects of the same object type within a predefined distance of the object The computer-executable program code portions of an example embodiment also include program code instructions configured to determine an expectation count for the object type based at least in part on a count of the object and the one or more objects of the same object type for the particular location. The computer-executable program code portions of an example embodiment also include program code instructions configured to disambiguate one or more object classifications from a plurality of object classifications based at least in part on the expectation count.

In some embodiments, the computer-executable program code portions of an example embodiment also include program code instructions configured to receive, from one or more additional vehicles, one or more indications of the object associated with an object classification for the object in view of the one or more vehicles. The object classification is further associated with the object type. The computer-executable program code portions of an example embodiment also include program code instructions configured to receive, from the one or more additional vehicles, information pertaining to one or more other objects of the same type within a predefined distance of the object in the same location. The computer-executable program code portions of an example embodiment also include program code instructions configured to determine whether the count of the object and the one or more objects of the same type for the particular location matches the expectation count for the object type in the particular location.

In some embodiments, the computer-executable program code portions of an example embodiment also include program code instructions configured to update the expectation count in an instance the count of the object and the one or more objects of the same type for the particular location is greater than the expectation count.

In some embodiments, the computer-executable program code portions of an example embodiment also include program code instructions configured to disambiguate by selecting one or more received objects, each associated with an object classification, for the particular location for use in a mapping model based at least in part on the expectation count.

In some embodiments, the computer-executable program code portions of an example embodiment also include program code instructions configured to determine a median expectation count based at least in part on the count of the object and the one or more objects of the same type and one or more historical counts of the object and the one or more objects of the same type for the particular location.

In some embodiments, the computer-executable program code portions of an example embodiment also include program code instructions configured to select one or more received objects, each associated with an object classification, for the particular location for use in a mapping model based at least in part on the median expectation count.

In some embodiments, the computer-executable program code portions of an example embodiment also include program code instructions configured to determine a nearest integer value for the median expectation count.

In another example embodiment, an apparatus is provided for disambiguating objects for a particular location. The apparatus includes means for receiving, from a vehicle, an indication of an object associated with an object classification for the object in view of the vehicle, wherein the object classification is further associated with an object type. The apparatus further includes means for receiving, from the vehicle, information pertaining to one or more other objects of the same object type within a predefined distance of the object. The apparatus further includes means for determining an expectation count for the object type based at least in part on a count of the object and the one or more objects of the same object type for the particular location. The apparatus further includes means for disambiguating one or more object classifications from a plurality of object classifications based at least in part on the expectation count.

In some embodiments, the apparatus further includes means for receiving, from one or more additional vehicles, one or more indications of the object associated with an object classification for the object in view of the one or more vehicles. The object classification is further associated with the object type. The apparatus further includes means for receiving, from the one or more additional vehicles, information pertaining to one or more other objects of the same type within a predefined distance of the object in the same location. The apparatus further includes means for determining whether the count of the object and the one or more objects of the same type for the particular location matches the expectation count for the object type in the particular location.

In some embodiments, apparatus further includes means for, updating the expectation count in an instance the count of the object and the one or more objects of the same type for the particular location is greater than the expectation count.

In some embodiments, apparatus further includes means for disambiguating by selecting one or more received objects, each associated with an object classification, for the particular location for use in a mapping model based at least in part on the expectation count.

In some embodiments, the apparatus further includes means for determining a median expectation count based at least in part on the count of the object and the one or more objects of the same type and one or more historical counts of the object and the one or more objects of the same type for the particular location.

In some embodiments, the apparatus further includes means for selecting one or more received objects, each associated with an object classification, for the particular location for use in a mapping model based at least in part on the median expectation count.

In some embodiments, apparatus further includes means for determining a nearest integer value for the median expectation count.

BRIEF DESCRIPTION OF THE DRAWINGS

Figure 1:
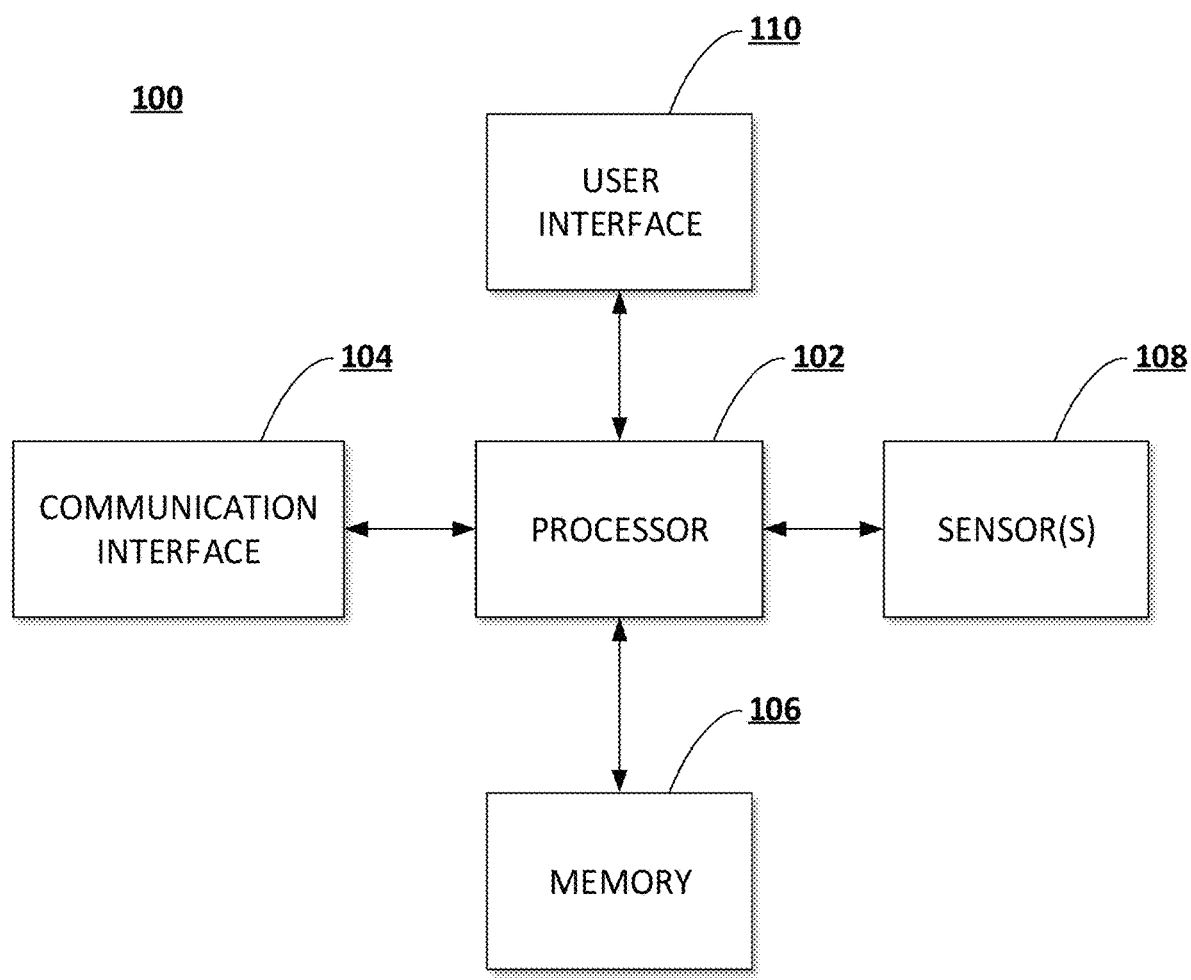
Figure 2:
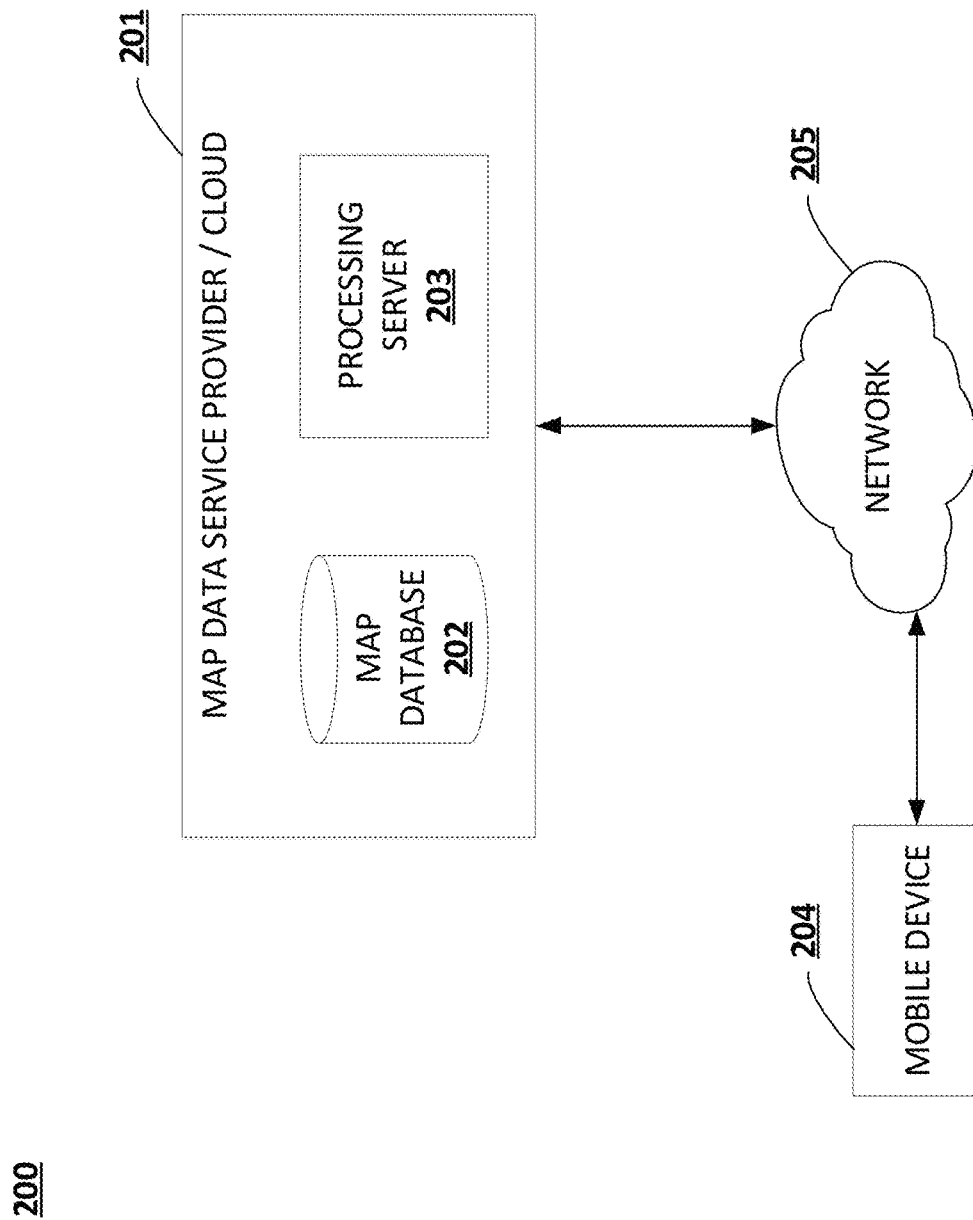

Having thus described certain embodiments of the invention in general terms, reference will now be made to the accompanying drawings, which are not necessarily drawn to scale, and where:

FIG. 1 is an apparatus that may be specifically configured in accordance with an example embodiment of the present disclosure in order to disambiguate one or more objects in accordance with an example embodiment of the present disclosure;

FIG. 2 is a block diagram of an overview of system that may be specifically configured to disambiguate one or more objects in view of a vehicle in accordance with an example embodiment of the present disclosure;

FIG. 3 is a flow chart illustrating operations performed, such as by the apparatus of FIG. 1 embodied by a computing device, in accordance with an example embodiment of the present disclosure;

FIG. 4 illustrates operations performed, such as by the apparatus of FIG. 1 embodied by a computing device, in order to disambiguate one or more objects in accordance with an example embodiment of the present disclosure; and FIG. 5 illustrates operations performed, such as by the apparatus of FIG. 1 embodied by a computing device, in order to select one or more objects in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In some situations, onboard sensors of vehicles may be used to classify objects but may do so incorrectly. This misclassification of objects may result in inaccurate and/or ambiguous data for mapping software as well as the provision of inaccurate navigational instructions for the vehicle. For example, if one hundred vehicles drive on a road segment with a posted 30 kph speed limit sign, 22 of those vehicles may misclassify the object, e.g. the 30 kph speed limit sign, as an 80 kph speed limit sign, while 78 of those vehicles may correctly classify the object. To mapping software attempting to classify the object for the associated location, such as for the particular road segment, it may be ambiguous as to whether there are two physical speed limit signs in close proximity, one with a 30 kph posted speed limit and the other with an 80 kph posted speed limit, or if there is only one object that was misclassified. Additionally, without the accurate classification of the object and guidance from a mapping model generated by the mapping software, vehicles which incorrectly classified the object may operate incorrectly on the road segment.

As such, it may be beneficial for a computing entity, such as a mapping software, to be informed of additional information, such as a count of the number of one or more other objects of the same object type that are nearby when receiving vehicle sensor data. In this way, a mapping software may use this information to disambiguate object classifications and determine an accurate number of the objects in a location and in some instance, may select an object classification for the object in the location.

To this end, a method, apparatus, and computer program product are provided in accordance with an example embodiment in order to disambiguate one or more objects for a particular location. In this regard, the method, apparatus and computer program product may select one or more received object classifications for one or more objects at the particular location based at least in part on information pertaining to one or more other objects of the same object type as the object in view of the vehicle that are within a predefined distance of the object. In some embodiments, an indication of the object classification and information pertaining to one or more other objects of the same type may be provided (e.g. transmitted, sent, etc.) to a computing entity, such as a mapping software, and may be used to determine an expectation count for the object type at the particular location. By relying at least in part upon expectation count for the object type at a particular location, a computing entity, such as a mapping software, may be provided with additional information such that it may disambiguate a cluster comprising one or more classified objects. Such disambiguation of one or more classified objects may thereby provide for increased accuracy of one or more map models produced by the computing entity.

FIG. 1 is a schematic diagram of an example apparatus configured for performing some of the operations described herein, particularly the processing of data to determine the classification of an object in view of a vehicle. Apparatus 100 may be embodied by or associated with any of a variety of computing devices. In some embodiments, the apparatus 100 comprises one or more computing devices, such as a central computing device, configured with mapping software to create and/or maintain high definition map data defining a road geometry and objects for a road network. In some embodiments, the apparatus 100 includes one or more computing devices, such as an onboard vehicle computing system, such as an Advanced Driver Assistance System (ADAS) module, that may be configured to identify and classify an object for objects on a road network, such as by using vision-based sensors according to some example embodiments described herein. However, embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus 100 may be embodied by or associated with a plurality of computing devices that are in communication with or otherwise networked with one another such that the various functions performed by the apparatus may be divided between the plurality of computing devices that operate in collaboration with one another.

In some embodiments, the apparatus 100 may be equipped with or receive information from any number of sensors 108, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in determining the classification of an object for a particular location and/or for navigation assistance as described herein according to example embodiments. In some example embodiments, such sensors may be implemented in a vehicle or other remote apparatus, and the information detected may be transmitted to the apparatus 100, such as by near field communication (NFC) including, but not limited to, Bluetooth™ communication, or the like.

The apparatus 100 may include, be associated with, or may otherwise be in communication with a communication interface 104, processor 102, memory device 106, one or more sensors 106, and a user interface 110. In some embodiments, the processor 102 (and/or co-processors or any other processing circuitry assisting or otherwise associated with the processor) may be in communication with the memory device 106 via a bus for passing information among components of the apparatus. The memory device 106 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device 106 may be configured to store information, data, content, applications, instructions, or the like for enabling the apparatus to carry out various functions in accordance with an example embodiment of the present invention. For example, the memory device 106 could be configured to buffer input data for processing by the processor 102. Additionally or alternatively, the memory device 106 could be configured to store instructions for execution by the processor 102.

The processor 102 may be embodied in a number of different ways. For example, the processor 102 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 102 may include one or more processing cores configured to perform independently. A multi-core processor may enable multiprocessing within a single physical package. Additionally or alternatively, the processor 102 may include one or more processors configured in tandem via the bus to enable independent execution of instructions, pipelining and/or multithreading.

In an example embodiment, the processor 102 may be configured to execute instructions stored in the memory device 106 or otherwise accessible to the processor 102. Alternatively or additionally, the processor 102 may be configured to execute hard coded functionality. As such, whether configured by hardware or software methods, or by a combination thereof, the processor 102 may represent an entity (for example, physically embodied in circuitry) capable of performing operations according to an embodiment of the present invention while configured accordingly. Thus, for example, when the processor 102 is embodied as an ASIC, FPGA or the like, the processor may be specifically configured hardware for conducting the operations described herein. Alternatively, as another example, when the processor 102 is embodied as an executor of software instructions, the instructions may specifically configure the processor to perform the algorithms and/or operations described herein when the instructions are executed. However, in some cases, the processor 102 may be a processor of a specific device (for example, the computing device) configured to employ an embodiment of the present invention by further configuration of the processor by instructions for performing the algorithms and/or operations described herein. The processor 102 may include, among other things, a clock, an arithmetic logic unit (ALU) and logic gates configured to support operation of the processor.

The apparatus 100 of an example embodiment may also include or otherwise be in communication with a user interface 110. The user interface may include a touch screen display, a speaker, physical buttons, and/or other input/output mechanisms. In an example embodiment, the processor 102 may comprise user interface circuitry configured to control at least some functions of one or more input/output mechanisms. The processor 102 and/or user interface circuitry 110 comprising the processor 102 may be configured to control one or more functions of one or more input/output mechanisms through computer program instructions (for example, software and/or firmware) stored on a memory accessible to the processor (for example, memory device 106, and/or the like).

The apparatus 100 of an example embodiment may also optionally include a communication interface 104 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 104 may be configured to communicate over Global System for Mobile Communications (GSM), such as but not limited to Long Term Evolution (LTE). In this regard, the communication interface 104 may include, for example, an antenna (or multiple antennas) and supporting hardware and/or software for enabling communications with a wireless communication network. Additionally or alternatively, the communication interface 104 may include the circuitry for interacting with the antenna(s) to cause transmission of signals via the antenna(s) or to handle receipt of signals received via the antenna(s). In some environments, the communication interface 104 may optionally support wired communication may alternatively support vehicle to vehicle or vehicle to infrastructure wireless links.

In some embodiments, the apparatus 100 may support a mapping or navigation application so as to present maps or otherwise provide navigation, driver assistance, or some degree of autonomous control of a vehicle. For example, the apparatus 100 may provide for display of a map and/or instructions for following a route within a network of roads via user interface 110. In order to support a mapping application, the computing device may include or otherwise be in communication with a geographic database, which may be a map of a vision-based mapping system, such as may be stored in memory 106. For example, the geographic database includes node data records, road segment or link data records, road segment objects, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a vision-based mapping system, the map stored in memory 106 may include a database of geo-referenced images used to identify the location of a vehicle through vision-based mapping techniques. In an example in which the apparatus 100 is embodied by a vehicle, the memory 106 may store a portion of a vision-based map database including only portions of the database that are within a predetermined geographic region relative to the vehicle such that latency may be reduced or minimized when establishing a location through analysis of the geo-referenced images.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location and the rules described by objects pertaining to said location is critical to navigation assistance and autonomous or semi-autonomous vehicle control.

Autonomous vehicles or vehicles with some level of autonomous controls provide some degree of vehicle control that was previously performed by a person driving a vehicle. Autonomous and semi-autonomous vehicle control may be performed in a variety of different ways. However, an understanding of the traffic rules for the road segment the vehicle is travelling on is critical when using any form of map-based vehicle control. While some degree of autonomy can be provided through visual identification of objects along a road by a vehicle traveling along the road, as previously mentioned, vehicle sensors may misclassify such objects and result in inaccurate operation of the vehicle. Therefore, such vision-based autonomous control strategies may benefit from or rely upon proper classification of such objects on the road network. For example, accurate classification of an object, such as a speed limit sign indicating the speed limit of a road segment, may provide an understanding of the traffic rules for the road segment which may be stored in the map database, such as in a High Definition (HD) map database.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network as depicted by objects. Further, HD maps may be dynamic and may receive updates periodically from map services providers which may be informed by vehicles traveling along the road segments with sensor packages able to identify and update the HD maps. Embodiments described herein may facilitate the building and updating of HD maps through the creation and updating of a map environment based on accurate classification of objects on road segments based on a sensor or an apparatus producing sensed data, such as an object classification and a count of one or more other objects of the same object type within a predefined distance from the object. Embodiments may create a visual map of an environment and/or a three dimensional model of an environment for inclusion in an HD map.

A map service provider database may be used to provide driver assistance via a navigation system and/or through an ADAS having autonomous or semi-autonomous vehicle control features. In some embodiments, the map service provider database may utilize a mapping software to generate and/or update HD maps. FIG. 2 illustrates a communication diagram of an example embodiment of a system for implementing example embodiments described herein. The illustrated embodiment of FIG. 2 includes a mobile device 204, which may be, for example, the apparatus 100 of FIG. 1, such as a mobile phone, an in-vehicle navigation system, an ADAS, or the like, and a map data service provider or cloud service 201 which may be, for example, the apparatus 100 of FIG. 1. Each of the mobile device 204 and map data service provider 201 may be in communication with at least one of the other elements illustrated in FIG. 2 via a network 205, which may be any form of wireless or partially wireless network as will be described further below. Additional, different, or fewer components may be provided. For example, many mobile devices 204 may connect with the network 205. The map data service provider 208 may be cloud-based services and/or may operate via a hosting server that receives, processes, and provides data to other elements of the system.

The map data service provider 201 may include a map database 202 that may include node data, road segment data or link data, point of interest (POI) data, traffic data, geo-referenced image data for vision-based locating, or the like. The map database 202 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 202 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 202 can include data about the POIs and their respective locations in the POI records. The map database 202 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 202 can include event data (e.g., traffic incidents, construction activities, scheduled events, unscheduled events, etc.) associated with the POI data records or other records of the map database 110.

The map data service provider 201 may include a mapping software configured to generate and/or maintain HD maps. The map database 202 may be maintained by a content provider e.g., the map data service provider and may be accessed, for example, by the content or service provider processing server 203. By way of example, the map data service provider 201 can collect geographic data and dynamic data to generate and enhance the map database 202 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 202, such as by the use of mapping software.

The map database 202 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 201 map database 202 may be a master geographic database, but in alternate embodiments, a client side map database may represent a compiled navigation database that may be used in or with end user devices (e.g., mobile device 204) to provide navigation and/or map-related functions. For example, the map database 202 may be used with the mobile device 204 to provide an end user with navigation features and/or to facilitate autonomous or partial autonomous control of a vehicle. In such a case, the map database 202 can be downloaded or stored on the end user device which can access the map database 110 through a wireless or wired connection, such as via a processing server 203 and/or the network 205, for example.

As described above, the map database 202 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the objects of road segments including the position of signs along the road segment and the information contained on the signs. This data may be crowd sourced by map data service providers 201 to build more robust and reliable maps with a greater level of detail than previously available. Further, beyond building the maps in the map database 202, sensor data may be used to update map data or confirm existing map data to ensure the map database 202 is maintained and as up-to-date as possible.

Autonomous and semi-autonomous vehicles may leverage sensor information relating to roads, objects, and features proximate to road segments to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed and classified objects, such as signs and detailed information contained therein along with other features or objects proximate a roadway.

HD maps may have a high precision at resolutions that may be down to a several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Crowd-sourced sensor data that may be used for updating, repairing, and generating HD map data may be generated from a plurality of different types of sensors having different qualities of sensors and different capabilities. Different vehicle manufacturers or device manufacturers may offer different levels of sensor data from different sensor suites associated with a vehicle or device. For example, a vehicle may include a GNSS or other satellite receiver for receiving GPS, GLONASS, Galileo, BeiDou, Compass or other navigation satellite signals. Additionally, or alternatively, a vehicle may include a radio frequency (RF) receiver configured to receive cellular signals, Wi-Fi signals, Bluetooth signals or other radio signals. Still further, a vehicle may include one or more image capture devices, such as cameras, including cameras for capturing still images and/or video recording devices for capturing video images. In this regard, the image capture devices may have fields of view that extend in various directions relative to the vehicle. For example, image capture devices that may be carried by a vehicle may include a front camera having a field of view that extends forward and to the sides of the vehicle and a rear camera having a field of view that extends rearward and to the sides of the vehicles. A vehicle may also carry additional cameras having different fields of view, such as fields of view to the opposed sides of the vehicle. The sensor data quality and sensor-specific offsets or calibration may vary widely such that not all sensed data can be processed in the same manner. For example, camera specific angles and camera mounting configurations may affect the interpretation of the sensed data from the respective sensor, which may lead different sensor platforms and/or different vehicles to classify the same object differently. As such, a challenge faced with different sensor platforms and data sourced from crowd-sourced apparatuses is that different sensors may classify objects differently, leading to ambiguous data such that mapping software, such as software provided by the map data service provider 201 may be unable to accurately determine the true number of objects at a particular location.

In order to use the crowd-sourced data to update a map database, sensor data including an object classification for an object sensed on a road segment may further include information pertaining to one or more other objects of the same object type within a predefined distance of the object. The inclusion of the information pertaining to one or more other objects of the same object type within a predefined distance of the object may inform mapping software, such as map data service provider 201, with determining an expectation count for objects of the same object type which may assist with accurately selecting and/or omitting received indications of object classifications for a particular location. Embodiments described herein provide a technique to automatically disambiguate one or more object classifications from a plurality of object classification based at least in part on an expectation count, thereby allowing mapping models rendered by a mapping software to be more accurate.

Referring now to FIG. 3, the operations that are illustrated are performed, such as by the apparatus 100 of FIG. 1 embodied by a computing device, such as map data service provider 201, in accordance with an example embodiment in order to disambiguate one or more objects for a particular location. In an example embodiment, the computing device may be configured to execute mapping software in order to perform the operations of FIG. 3 that are described below. In some embodiments, the map data service provider 201 performing various functions described below also includes performance of those functions by the apparatus embodied by the computing device that serves as the map data service provider.

Referring now to block 301 of FIG. 3, the apparatus 100 embodied by a computing device, such as map data service provider 201, may include means, such as the processor 102, the communication interface 104, memory 106 or the like, for receiving an indication of an object associated with an object classification for an object in view of a vehicle. In some embodiments, the object classification may have been determined using one or more of the vehicles onboard sensors. In some embodiments, the object classification may have been determined by the vehicle using one or more image capture devices configured to capture one or more images to determine an object type and/or object classification for the object based at least in part on the appearance of the object. In some embodiments, the indication of an object associated with an object classification may be stored in an associated memory, such as memory 106.

As shown in block 302 of FIG. 3, the apparatus 100 embodied by a computing device, such as map data service provider 201 may include means, such as the processor 102, the communication interface 104, memory 106 or the like, for receiving information pertaining to one or more other objects of the same object type within a predefined distance of the object. In some embodiments, the information pertaining to one or more other objects of the same type is a count of one or more other objects of the same object type within a predefined distance of the object. For example, the count of one or more other objects of the same type may be two, indicative that two other objects of the same type are within a predefined distance of the object. In some embodiments, information pertaining to the one or more other objects of the same object type may include the object classification of the one or more other objects of the same object type. For example, the object may be a straight directional arrow object and the information pertaining to the one or more other objects may be indicative that a left arrow object and right arrow object are within a predefined distance of the straight arrow object. In some embodiments, the map data service provider 201 may receive the information pertaining to the one or more other objects of the same object type within a predefined distance simultaneously with the indication of the object from block 401. In some embodiments, the one or more onboard sensors of the vehicle may capture one or more images may determine an object type and/or object classification for the one or more other objects of the same object type based at least in part on the appearance of the one or more other objects. In some embodiments, the information pertaining to one or more other objects of the same type may be stored in an associated memory, such as memory 106.

In some embodiments, an object type may be a categorical in nature such that an object type contains one or more objects with similar features. The definition of an object type may be configured to be as broad or narrow as desired. Additionally, an object classification may be defined within the object type. For example, in one embodiment, all road signs may be of the same object type, such as a sign object type. Sign object types may include speed limit signs, stop signs, directional signs, and the like. In this example embodiment, a 30 kph speed limit sign would be considered a sign object type and would be classified as a speed limit sign classification. Similarly, an 80 kph speed limit sign would be considered a sign object type and would be classified as a speed limit sign classification.

As another example, in an example embodiment, all speed limit signs may be of the same object type, such as a speed limit object type. Speed limit object types may include all speed limit signs regardless of the posted speed limit. In this example embodiment, a 30 kph speed limit sign would be considered a speed limit object type and would be classified as a 30 kph speed limit classification. Here, an 80 kph speed limit sign would be considered a speed limit object type and would be classified as an 80 kph speed limit classification.

By way of example, the map data service provider 201 may receive an object classification of a straight arrow, which may have an object type of directional arrows. The directional arrow object type may comprise all directional arrows found on road segments, such as straight, right, and left directional arrow objects. The map data service provider 201 may also receive a count of 1 other object of the same object type (e.g., also a directional arrow type) within a predetermined distance, such as within 5 meters, from the straight arrow. In some embodiments, map data service provider 201 may additionally or alternatively receive an indication that the one or more other objects of the same object type within the predetermined distance of the straight arrow object is a right arrow object, such that the map data service provider 201 may be informed of the exact object classification of the one or more other objects within the predetermined distance of the straight arrow object.

As another example, the map data service provider 201 may receive an object classification indicating a 30 kph speed limit object, which may have a speed limit object type. The speed limit object type may comprise all speed limit signs, which may be classified by their depicted speed limits. The map data service provider 201 may also receive a count of 0 other objects of the same object type within a predetermined distance of the 30 kph speed limit object. As such, the map data service provider 201 may determine that no other speed limit object types exist within the predetermined distance of the 30 kph speed limit object.

As shown in block 303, the apparatus 100 embodied by a computing device, such as map data service provider 201 may include means, such as the processor 102, memory 106 or the like, for determining an expectation count for the object type based at least in part on a count of the object and the one or more objects of the same object type for the particular location. For example, if an indication of an object associated with a straight directional arrow object classification is received and information pertaining to one or more objects is indicative of a count of two objects of the same object type, the expectation count is determined to be three. As another example, if an indication of an object associated with a straight directional arrow object classification and if information pertaining to the one or more objects is indicative of a left directional arrow object classification and right directional arrow object classification, the expectation count would be determine to be three.

In some embodiments, the expectation count is indicative of the number of objects of the object type for the particular location. In the event one or more vehicles misclassify an object, the information pertaining to the one or more other objects of the same type in the same location should remain unchanged, unless an object has been added and/or removed from the location, such that the expectation count should remain constant. As such, the map data service provider 201 can rely on the expectation count to determine an accurate number of objects of the object type at the particular location. In some embodiments, the expectation count for the object type may be stored in an associated memory, such as memory 106.

As shown in block 304, the apparatus 100 embodied by a computing device, such as map data service provider 201 may include means, such as the processor 102 or the like, for disambiguating one or more object classifications from a plurality of object classifications based at least in part on the expectation count. The expectation count may be indicative of the number of objects of a certain object type expected to belong in a particular geographic area. For example, an expectation count of one for a speed limit object type may indicate that only one speed limit sign is expected at a particular location. As such, the map data service provider 201 may use this expectation count to disambiguate a plurality of object classifications for one or more objects in the particular location. For example, if the map data service provider 201 has received a plurality of object classifications indicative of an 80 kph speed limit object and a 30 kph speed limit object but the particular location has an expectation count of one speed limit sign object type, the map data service provider 201 may determine that only one speed limit object type exists at the particular location and was the speed limit object type was misclassified once. As will be discussed in further detail with respect to FIG. 5, the map data service provider 201 may select and/or omit one or more objects associated with one or more object classifications pertaining to the particular location based at least in part on the expectation count. In this way, the map data service provider 201 may more accurately reflect the current status of a road segment and the one or more objects pertaining thereto.

Referring now to block 401 of FIG. 4, the apparatus 100 embodied by a computing device, such as map data service provider 201 may include means, such as the processor 102, communication interface 104, memory 106 or the like, for receiving, from one or more vehicles, one or more indications of the object associated with an object classification for the object in view of the one or more vehicles for the same location. Similar to the process described in block 301, the map data service provider 201 may receive one or more indications of the object from one or more additional vehicles pertaining to the same location. The one or more indications of the object may each be indicative of an object classification. The one or more object classifications received from the one or more vehicles may be the same object classification or a different object classification as the object classification received in block 301. In some embodiments, the object classification may be determined by the one or more onboard sensors of the one or more vehicles. Each of the one or more vehicles may utilize one or more different sensors to classify the object such that in some instances, the object may be classified incorrectly by one or more vehicles. As such, the map data service provider 201 may receive different object classifications, which may actually pertain to the same object. In some embodiments, the one or more indications of the object may be stored in an associated memory, such as memory 106.

Referring now to block 402 of FIG. 4, the apparatus 100 embodied by a computing device, such as map data service provider 201 may include means, such as the processor 102, communication interface 104, or the like, for receiving, from the one or more vehicles, information pertaining to one or more other objects of the same type within a predefined distance of the object in the same location. Similar to block 302, the map data service provider 201 may also receive information pertaining to one or more other objects of the same type within a predefined distance of the object with each received instance of an indication of an object in view of the vehicle for the one or more vehicles. In some embodiments, the information pertaining to one or more other objects of the same object type may be stored in an associated memory, such as memory 106.

Referring now to block 403 of FIG. 4, the apparatus 100 embodied by a computing device, such as map data service provider 201 may include means, such as the processor 102, or the like, for determining whether the count of the object and the one or more objects of the same type for the particular location matches the expectation count for the object type in the particular location. In some embodiments, in order for the count of the object and the one or more objects of the same type for the particular location and the expectation count for the object type in the particular location to match, the counts must exactly match. For example, the expectation count for direction arrow object types is two in a particular location. If the map data service provider 201 determines a count of two for the object and the one or more objects of the same type as received from an additional vehicle, the count of the object and the one or more objects of the same type for the particular location and the expectation count for the object type in the particular location is determined to match.

In some embodiments, in order for the count of the object and the one or more objects of the same type for the particular location and the expectation count for the object type in the particular location to match, the count of the object and the one or more objects of the same type may be equal to or less than the expectation count. By way of continuing example, the expectation count for direction arrow object types is two in a particular location. If the map data service provider 201 determines a count of one for the object and the one or more objects of the same type as received from an additional vehicle, the count of the object and the one or more objects of the same type for the particular location and the expectation count for the object type in the particular location is determined to match. As such, this allows for a vehicle to not identify an object of the same type. For various reasons, in some instances, a vehicle may not be able to identify each object of the same object type, such as when the object is obscured by another vehicle. As such, the count of the object and the one or more other objects may still be determined to match the expectation count for the object type even in the instance the count of the object and one or more objects of the same object type is less than the expectation count.

Referring now to block 404 of FIG. 4, the apparatus 100 embodied by a computing device, such as map data service provider 201 may include means, such as the processor 102, memory 106, or the like, for updating the expectation count in an instance the count of the object and the one or more objects of the same type for the particular location is greater than the expectation count. In some embodiments, the expectation count may set the upper limits of the count of objects of the same object type for a particular location. In the instance the map data service provider determines a count of the object and the one or more other objects that is greater than the expectation count, this may be indicative that there are more objects of the same object type at the particular location than indicated by the previous expectation count. This may occur, for example, when one or more vehicles do not identify the one or more objects of the same type, such as when the object is obscured by another vehicle. As such, the map data service provider 201 may update the expectation count to reflect the new expectation count for the object type. In some embodiments, the expectation count for the object type may be stored in an associated memory, such as memory 106.

In some embodiments, the map data service provider 201 may additionally or alternatively determine a median expectation count based at least in part on a plurality of received counts of the object and the one or more objects of the same type. In some embodiments, the median expectation count may be used instead of the expectation count. The value of the median expectation count may be the middle value of the plurality of counts of the object and the one or more objects of the same type for the particular location. In some embodiments, the plurality of counts of the object and the one or more objects of the same type for the particular location may be accessed from an associated memory, such as memory 106. For example, the map data service provider 201 may have stored counts of the object and the one or more objects of the same type based on received data from five vehicles.

As such, five counts of the object and the one or more objects of the same type may have been determined and/or stored in an associated memory, such as memory 201. The map data service provider may sort the one or more counts of the object and the one or more objects of the same type, either in descending or ascending order, and select in the median value for the count of the object and the one or more objects of the same type. The selected value may be used as the median expectation count value. In some embodiments, if there are an even number of counts of the object and the one or more objects of the same type, the average between the two middle-most counts of the object and the one or more objects of the same type may be determined and selected as the median expectation count value. In some embodiments, in the instance the average of the two middle-most counts of the object is a non-integer value, the value may be rounded to the nearest integer value and used as the median expectation count. In this way, the median expectation count may eliminate instances of false positives of received counts of the object and the one or more objects of the same type for the particular location.

In some embodiments, only the plurality of counts of the object and the one or more objects of the same type that were received within a predefined period time are accessed from an associated memory and selected when determining the median expectation count. For example, only counts of the object and the one or more objects of the same type received within the past six months are selected when determining the median expectation count for the object type at the particular location. In this way, if a change does to the road segment and/or the objects pertaining to the road segment, the map data service provider 201 may use recently received data and may update the median expectation count to reflect this change. For example, if a directional arrow is painted over such that the count of the object and the one or more objects of the same type decreases from three directional arrow objects to two directional arrow objects, map data service provider 201 may receive a plurality of counts of the object and the one or more objects of the same type indicating two direction arrow objects. Over time, the value two will become the median expectation count for the plurality of counts of the object and the one or more objects of the same type. As such, the median expectation count may also account for changes to the road segment and/or object pertaining to the road segment.

Referring now to block 501 of FIG. 5, the apparatus 100 embodied by a computing device, such as map data service provider 201 may include means, such as the processor 102, memory 106, or the like, for selecting one or more received objects each associated with an object classification for the particular location. In some embodiments, the map data service provider 201 may select the one or more objects for the particular location based at least in part on the expectation count. In some embodiments, the map data service provider 201 may select the one or more objects for the particular location based at least in part on the median expectation count. In some embodiments, the map data service provider may receive a plurality of indications of an object for a particular location. In some embodiments, the object classification of the received indications of the object may be the same. The expectation count for the object type may exactly match the received objects such that each received object associated with an object classification is selected.

In some embodiments, as described above, in some instances, the object classification of the received indications of the object may not be the same. As such, the map data service provider 201 may select the most likely objects associated with object classifications from the plurality of received object classifications up to the value indicated by the expectation count and/or median expectation count. For example, the map data service provider 201 receives 22 indications of an object indicative of an object classification of 80 kph speed limit object and 78 indications of an object indicative of an object classification of 30 kph speed limit object. If the expectation count for the speed limit sign object type is one, the map data service provider 201 may select only one speed limit object for the particular area. As such, the map data service provider 201 may select the 30 kph speed limit object classification for the object at the particular location.

In some embodiments, the map data service provider 201 may provide the one or more selected objects each associated with an object to a mapping model, such as to processing server 203 for use in the map database 202. As such, the map database may be updated to reflect an accurate number of objects of the object type at the particular location as well as a probabilistic object classification for the one or more objects. In some embodiments, providing the one or more selected objects to the mapping model, such as map data service provider 201 may cause the mapping model to be provided to mobile device 204, such as via the network 205. In some embodiments, the mobile device 204 is a computing device onboard a vehicle, such as the vehicle that provided the object classification and count of one or more other objects of the same object type within a predefined distance, to assist in the provision of one or more navigational instructions. In some embodiments, the mobile device 204 is a computing device onboard a vehicle, such as an ADAS module configured to execute one or more navigational instructions.

Referring now to block 502 of FIG. 5, the apparatus 100 embodied by a computing device, such as map data service provider 201 may include means, such as the processor 102, memory 106, or the like, for omitting one or more received objects each associated with an object classification for the particular location. In some embodiments, the map data service provider 201 may omit one or more objects for the particular location based at least in part on the expectation count. In some embodiments, the map data service provider 201 may omit the one or more objects for the particular location based at least in part on the median expectation count. In some embodiments, the map data service provider may receive a plurality of indications of an object for a particular location. In some embodiments, the object associated with the object classification of the received indications of the object may be the same. The expectation count for the object type may exactly match the received number of objects such that no received objects are omitted.

In some embodiments, as described above in block 501, in some instances, the object classification of the received indications of the object may not be the same. As such, the map data service provider 201 may omit the least likely objects associated with an object classification from the plurality of received indications of an object up to the value indicated by the expectation count and/or median expectation count. By way of continuing example, the map data service provider 201 receives 22 indications of an object indicative of an object classification of 80 kph speed limit object and 78 indications of an object indicative of an object classification of 30 kph speed limit object. If the expectation count for the speed limit sign object type in the particular area is one, the map data service provider 201 may omit one speed limit object classification for the particular area. As such, the map data service provider 201 may select the 80 kph speed limit object classification as the object at the particular location. The one or more objects omitted by the map data service provider 201 are not provided to a mapping model, such as to processing server 203 for use in the map database 202. As such, the one or more map models do not incorporate the one or more omitted items such that the one or more map models more accurately depict the number of objects of an object type for the particular location.

The disambiguation of one or more objects pertaining to one or more road segments may be important, as these objects may provide driving operation instructions for vehicles and/or drivers driving on a particular road segment. By including information pertaining to one or more other objects of the same object type that are nearby when classifying an object pertaining to a road segment, a mapping software may use this count to disambiguate object classifications and determine an accurate number of the objects in a location. Said mapping software may utilize this information to select and/or omit one or more objects at a particular location. As such, more accurate map data may be provided to a vehicle, such as to an autonomous or semi-autonomous vehicle, and/or to a user or driver of a vehicle.

FIGS. 3-5 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 106 of an apparatus 100 employing an embodiment of the present invention and executed by the processing circuitry 102. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for disambiguating objects for a particular location, the method comprising:
   receiving, from a vehicle, an indication of an object associated with an object classification for the object in view of the vehicle, wherein the object classification is further associated with an object type;
   receiving, from the vehicle, information pertaining to one or more other objects of the same object type within a predefined distance of the object;
   determining an expectation count for the object type based at least in part on a count of the object and the one or more objects of the same object type for the particular location; and
   disambiguating one or more object classifications from a plurality of object classifications based at least in part on the expectation count.

2. The method according to claim 1 further comprising:
   receiving, from one or more additional vehicles, one or more indications of the object associated with an object classification for the object in view of the one or more vehicles, wherein the object classification is further associated with the object type;
   receiving, from the one or more additional vehicles, information pertaining to one or more other objects of the same type within a predefined distance of the object in the same location; and
   determining whether the count of the object and the one or more objects of the same type for the particular location matches the expectation count for the object type in the particular location.

3. The method according to claim 2 further comprising, updating the expectation count in an instance the count of the object and the one or more objects of the same type for the particular location is greater than the expectation count.

4. The method according to claim 1, wherein disambiguating further comprising selecting one or more received objects, each associated with an object classification, for the particular location for use in a mapping model based at least in part on the expectation count.

5. The method according to claim 1, further comprising determining a median expectation count based at least in part on the count of the object and the one or more objects of the same type and one or more historical counts of the object and the one or more objects of the same type for the particular location.

6. The method according to claim 5, further comprising selecting one or more received objects, each associated with an object classification, for the particular location for use in a mapping model based at least in part on the median expectation count.

7. The method according claim 6, further comprising determining a nearest integer value for the median expectation count.

8. An apparatus comprising:
at least one processor; and
at least one memory including computer program code, the at least one memory and the computer program code configured to, with the at least one processor, cause the apparatus at least to:
receive, from a vehicle, an indication of an object associated with an object classification for the object in view of the vehicle, wherein the object classification is further associated with an object type;
receive, from the vehicle, information pertaining to one or more other objects of the same object type within a predefined distance of the object;
determine an expectation count for the object type based at least in part on a count of the object and the one or more objects of the same object type for the particular location; and
disambiguate one or more object classifications from a plurality of object classifications based at least in part on the expectation count.

9. The apparatus according to claim 8, wherein the at least one memory and the computer program code are further configured to, with the at least one processor, cause the apparatus at least to:
receive, from one or more additional vehicles, one or more indications of the object associated with an object classification for the object in view of the one or more vehicles, wherein the object classification is further associated with the object type;
receive, from the one or more additional vehicles, information pertaining to one or more other objects of the same type within a predefined distance of the object in the same location; and
determining whether the count of the object and the one or more objects of the same type for the particular location matches the expectation count for the object type in the particular location.

10. The apparatus according to claim 9, wherein the at least one memory and the computer program code are further configured to, with the at least one processor, cause the apparatus at least to update the expectation count in an instance the count of the object and the one or more objects of the same type for the particular location is greater than the expectation count.

11. The apparatus according to claim 8, wherein the at least one memory and the computer program code are further configured to, with the at least one processor, cause the apparatus at least to disambiguate by selecting one or more received objects, each associated with an object classification, for the particular location for use in a mapping model based at least in part on the expectation count.

12. The apparatus according to claim 9, wherein the at least one memory and the computer program code are further configured to, with the at least one processor, cause the apparatus at least to determine a median expectation count based at least in part on the count of the object and the one or more objects of the same type and one or more historical counts of the object and the one or more objects of the same type for the particular location.

13. The apparatus according to claim 12, wherein the at least one memory and the computer program code are further configured to, with the at least one processor, cause the apparatus at least to select one or more received objects, each associated with an object classification, for the particular location for use in a mapping model based at least in part on the median expectation count.

14. The apparatus according to claim 13, wherein the at least one memory and the computer program code are further configured to, with the at least one processor, cause the apparatus at least to determine a nearest integer value for the median expectation count.

15. A computer program product comprising at least one non-transitory computer-readable storage medium having computer executable program code instructions stored therein, the computer executable program code instructions comprising program code instructions to:
receive, from a vehicle, an indication of an object associated with an object classification for the object in view of the vehicle, wherein the object classification is further associated with an object type;
receive, from the vehicle, information pertaining to one or more other objects of the same object type within a predefined distance of the object;
determine an expectation count for the object type based at least in part on a count of the object and the one or more objects of the same object type for the particular location; and
disambiguate one or more object classifications from a plurality of object classifications based at least in part on the expectation count.

16. The computer program product of claim 15, wherein the computer-executable program code portions further comprise program code instructions configured to:
receive, from one or more additional vehicles, one or more indications of the object associated with an object classification for the object in view of the one or more vehicles, wherein the object classification is further associated with the object type;
receive, from the one or more additional vehicles, information pertaining to one or more other objects of the same type within a predefined distance of the object in the same location; and
determining whether the count of the object and the one or more objects of the same type for the particular location matches the expectation count for the object type in the particular location.

17. The computer program product of claim 16, wherein the computer-executable program code portions further comprise program code instructions configured to update the expectation count in an instance the count of the object and the one or more objects of the same type for the particular location is greater than the expectation count.

18. The computer program product of claim 15, wherein the computer-executable program code portions further comprise program code instructions configured to disambiguate by selecting one or more received objects, each associated with an object classification, for the particular location for use in a mapping model based at least in part on the expectation count.

19. The computer program product of claim 15, wherein the computer-executable program code portions further comprise program code instructions configured to determine a median expectation count based at least in part on the count of the object and the one or more objects of the same type and one or more historical counts of the object and the one or more objects of the same type for the particular location.

20. The computer program product of claim 19, wherein the computer-executable program code portions further comprise program code instructions configured to select one or more received objects, each associated with an object classification, for the particular location for use in a mapping model based at least in part on the median expectation count.

* * * * *

UNITED STATES PATENT AND TRADEMARK OFFICE
CERTIFICATE OF CORRECTION

| | |
|---|---|
| PATENT NO. | : 11,557,130 B2 |
| APPLICATION NO. | : 17/347775 |
| DATED | : January 17, 2023 |
| INVENTOR(S) | : Dennis Scott Williamson |

It is certified that error appears in the above-identified patent and that said Letters Patent is hereby corrected as shown below:

In the Claims

In Column 23, Line 9, Claim 7, delete "according claim" and insert -- according to claim --, therefor.

Signed and Sealed this
Tenth Day of October, 2023

Katherine Kelly Vidal
*Director of the United States Patent and Trademark Office*